Patented Apr. 18, 1939

2,154,934

UNITED STATES PATENT OFFICE 2,154,934

PURIFIED BEE POISON

Georg Hahn, Frankfort-on-the-Main, Germany

No Drawing. Application December 15, 1936, Serial No. 115,955. In Germany September 29, 1936

7 Claims. (Cl. 167—74)

The healing action of bee poison against rheumatic ailments has long been known. These observations have been fully confirmed by recent clinical investigations. Bee poison therapeutics, nevertheless, has only become generally applicable since Dr. Karl August Forster succeeded in bringing the bee poison in the form of an ointment which enables the bee poison to be introduced beneath the skin by rubbing, thereby avoiding both the painfulness of the bee sting and the difficult injection by syringing. Heretofore, both in the manufacture of this ointment and also in the production of solutions of bee poison capable of being injected, aqueous solutions of the bee poison have always been used, these having been obtained by extraction of the sting apparatus and poison sacs of the bees, or by collecting in water the drops of poison issuing from the sting, or by subsequently dissolving the poison in water. Such solutions contain of course, in addition to the bee poison, a number of inactive accompanying substances.

I have now found that the active substance of bee poison can be obtained in the form of a white stable powder if the extract obtained by extracting the stings and poison glands of bees with dilute organic acids is subjected in an absolutely dry state to a fractional extraction with alcohol of increasing water-content. Both the extraction of the stings and glands with dilute acids and also the evaporation of the extracts obtained must be carried out at a low temperature in a high vacuum at 20° C. at the most. Whilst only the inactive accompanying substances are dissolved when 80 to 100% alcohol is employed, I have found that an aqueous alcohol of 55 to 65% dissolves only the active substance of the bee poison, the inactive inert substances being left behind. After evaporating down the extract obtained with 55 to 65% alcohol, there is left a powder which, if necessary, is again subjected to fractional extraction with alcohols. There is finally obtained a white powder which dissolves readily in water forming a colorless solution which remains clear even upon boiling.

The powder obtained is a highly active, very pure preparation of bee poison which can be kept in the dry state for an indefinite length of time and which permits a more accurate dosage of the poison than has been possible with the preparations known heretofore.

The acids employed for the acid extraction of the stings and poison sacs are such as are volatile with water vapour and are selected from the group consisting of formic acid, acetic acid and lactic acid and in this specification the word "acids" is to be understood to be restricted to acids of this group. Preferably, the concentration will not be too strong; half-normal solutions even are sufficient. Apart from ethyl alcohol, it is also possible to use methyl alcohol. The term "alcohol" is in this specification and in the claims limited to alcohols of this group.

*Example*

Poison glands and stings of 1000 bees are allowed to stand twice with 100 cc. of half-normal formic acid solution for 3 hours at the ordinary temperature in each case, and are then filtered at the pump and washed. The solutions are evaporated to dryness in a high-vacuum evaporator at about 10 to 15° C.

In the first extraction of the glands and stings, 442 mg. of crude poison were obtained and in the subsequent extraction 43 mg., that is to say, altogether 465 mg. of crude poison. A third extract (28 mg.), on the contrary, was found to be absolutely free from poison.

3.2472 grams of the extracted and dried crude poison obtained in this way from 8000 bees were made completely anhydrous over phosphorus pentoxide. From this absolutely dry product, the inactive inert substances were then removed by exhaustive treatment with absolute alcohol.

The product is thereupon treated with 60% alcohol, the bee poison alone dissolving, while the inactive accompanying albuminoid substances coagulated by the absolute alcohol remain behind.

After evaporating down the 60% alcohol extract in a high vacuum, there is left a powder which if necessary may be again purified with 100% alcohol. There finally remains a white powder.

I claim:

1. A process of producing purified bee-venom which comprises extracting the stings and poison glands of bees with a dilute organic acid which is volatile in water vapour, evaporating the extract to dryness in a high vacuum evaporator at a temperature not exceeding 20° C., treating the dried extract with a concentrated alcohol to remove the inactive inert substances, extracting the residue with an aqueous alcohol of a concentration between 55% and 65%, and evaporating the solution to dryness under a high vacuum.

2. The process for the production of purified bee-venom as set forth in claim 1, wherein the alcohol employed is ethyl alcohol.

3. The process for the production of purified bee-venom as set forth in claim 1, wherein the alcohol employed is methyl alcohol.

4. The process for the production of purified bee-venom as set forth in claim 1, wherein the acid volatile in water vapour, employed for the extraction is formic acid.

5. The process for the production of purified bee-venom as set forth in claim 1, wherein the acid volatile in water vapour, employed for the extraction is acetic acid.

6. The process for the production of purified bee-venom as set forth in claim 1, wherein the acid volatile in water vapour, employed for the extraction is lactic acid.

7. The process for the production of purified bee-venom as set forth in claim 1, wherein the residue remaining after treatment with a concentrated alcohol is subjected to further purification with an alcohol of a concentration between 80% and 90% before the extraction with an alcohol of a concentration between 55% and 65%.

GEORG HAHN.